(12) United States Patent
Eisenstadt et al.

(10) Patent No.: US 9,557,224 B2
(45) Date of Patent: Jan. 31, 2017

(54) MONITORING SYSTEM FOR PERISHABLE OR TEMPERATURE-SENSITIVE PRODUCT TRANSPORTATION AND STORAGE

(71) Applicant: UNIVERSITY OF FLORIDA RESEARCH FOUNDATION, INCORPORATED, Gainesville, FL (US)

(72) Inventors: William R. Eisenstadt, Gainesville, FL (US); Adam C. Kinsey, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 22 days.

(21) Appl. No.: 14/585,294

(22) Filed: Dec. 30, 2014

(65) Prior Publication Data
US 2015/0192475 A1    Jul. 9, 2015

Related U.S. Application Data

(60) Provisional application No. 61/924,845, filed on Jan. 8, 2014.

(51) Int. Cl.
*G01K 1/02*  (2006.01)
*H04Q 9/00*  (2006.01)
*G01K 13/10*  (2006.01)

(52) U.S. Cl.
CPC ............. *G01K 1/02* (2013.01); *G01K 13/10* (2013.01); *H04Q 9/00* (2013.01); *H04Q 2209/823* (2013.01)

(58) Field of Classification Search
CPC ............ G01K 1/02; G01K 13/00; H04Q 9/00
See application file for complete search history.

(56) References Cited

U.S. PATENT DOCUMENTS

2015/0233847 A1*  8/2015  Hogan .................. G01N 25/00
                                                           374/134

* cited by examiner

*Primary Examiner* — Leon Flores
(74) *Attorney, Agent, or Firm* — Saliwanchik, Lloyd & Eisenschenk

(57) ABSTRACT

Monitoring and reporting of the temperature and/or other conditions of perishable and/or temperature sensitive products during transportation and storage is described. A system for wireless temperature monitoring can be carried out at a box level, but can provide information at a finer granularity than box-level. For temperature monitoring, the box (or other container) can be configured with a plurality of temperature sensors provided in an arrangement about the box and connected to a transmitter for communicating the temperature at each location to a monitoring system with a processor and database. A temperature profile and spatial model can be constructed by the processor and stored at the database to generate profiles for defined volumes within the container.

13 Claims, 8 Drawing Sheets

MONITORING SYSTEM FOR PERISHABLE OR TEMPERATURE-SENSITIVE PRODUCT TRANSPORTATION AND STORAGE

CROSS REFERENCE TO RELATED APPLICATION

The present application claims the benefit of U.S. Provisional Application Ser. No. 61/924,845 filed Jan. 8, 2014, which is hereby incorporated by reference herein in its entirety, including any figures, tables, or drawings.

BACKGROUND

Many products require particular handling to ensure that the product is safe and/or useable after being transported or stored for a period of time. Food products and medical related products fall into this category. In many cases, there are governmental regulations, such as provided by the Food and Drug Administration (FDA), for the care and handling of certain products.

Blood products are an example of medical related products that require particular handling during transportation and storage. For example, a community blood supplier works with donors, blood centers, and hospitals and other healthcare service providers to provide blood products and services. As part of a blood supplier's responsibilities, blood donations are collected and the donated blood is provided to refrigerated blood lockers in hospitals and other healthcare facilities. The blood supplier is responsible for inventorying and tracking their blood to a blood locker or other storage facility and removing the blood that is old or not usable from the blood locker or other storage facility.

The donated blood supply chain for hospitals and medical emergencies is heavily regulated by the FDA. To prevent problems occurring during transfusion of, or experimentation with, the collected blood, the FDA has established requirements for the handling of blood. For example, blood products are required to be stored in refrigerators with strict temperature control. In addition, blood products are required to be packed and transported in FDA certified containers under controlled conditions.

For example, it is important when transporting blood for later uses or transfusion to maintain equilibrium between glucose, adenosine triphosphate (ATP), and pH levels. All three of these components are temperature dependent. One concern with blood transportation is the growth of bacteria, which would contaminate the blood. At temperatures higher than 6° C., it is assumed that bacteria would be able to grow to such an extent as to deem the blood contaminated. In addition, higher temperatures can increase the rate of natural senescence of the red blood cells. Another concern is preventing hemolysis. When red blood cells start to freeze (below 2° C.), the cells' membranes start to rupture allowing the hemoglobin to be released out of the cells. Therefore, whole blood and red blood cells are suggested to be stored between 2° C. and 6° C. Other blood related products such as plasma and cryoprecipitate are required to be frozen for storage. For example, plasma is recommended to be stored at −30° C. and must always stay a frozen solid in order to be considered usable.

During transportation or in readying for use, blood products may be exposed to higher than recommended and sometimes lower than recommended temperatures. FDA regulations indicate that when transporting pre-processed blood, the temperature cannot be allowed to be at a temperature in the range of 20° C.-24° C. for more than six hours.

The precise temperature ranges are crucial to maintain in an effort to diminish risks from using contaminated or mishandled blood. However, the temperature information is not available in the transported blood bag containers, when the blood is taken from refrigeration, or when the blood is awaiting use in an operating room during surgeries. Instead, temperature information is known only at a large scale level, such as a refrigerator with hundreds of blood bags. This lack of information at the blood bag level results in blood (at the individual blood bag level) being discarded when the blood bag's temperature handling and history is questionable. Similar issues arise and waste may occur for other products (such as other medical products, food products, and sensitive/perishable materials) as well.

BRIEF SUMMARY

Systems and techniques for wireless monitoring of perishable and temperature-sensitive products are described. Implementations may enable the observation, recording, and reporting of the temperature of containers and the contents within during transportation, during hospital usage (for blood products), and under storage conditions.

A monitoring system can include a plurality of temperature sensors for attachment to a container used in the transportation of a product. The container may be a disposable container, for example made of cardboard or other recyclable materials. The plurality of temperature sensors can be configured for wireless transmission of temperature information through at least one node. In addition to temperature sensors, other sensors may be included as part of the sensor nodes arranged on the container. The sensors attached to the container may be connected to each other via wired or wireless methods. In some cases, the sensors may be configured as a mesh network on the container.

One or more transmitters can be provided to transmit the sensor data from the container to a central database for real-time tracking and logging of the temperature (and optionally other sensor) information. In some implementations, a storage device may be included to maintain a local temperature log.

In certain implementations, the plurality of temperature sensors transmits the temperature information to a processor located on or off of the container. The processor can execute instructions of a monitoring program to construct a spatial model of the temperature of the container. The spatial model can provide a temperature profile for contents within the container and can be used to generate alerts when temperatures exceed a threshold.

The spatial model can be constructed by the processor executing software that interpolates temperature from sensor data between the sensors. The system can further construct a temperature profile across the container and measure and report wirelessly critical events such as a lifting of a lid of the container and the subsequent temperature increase or an accidental puncture in the container. An alarm capability can further be provided to report issues in the temperature data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and techniques for wireless monitoring of perishable and temperature-sensitive products are described. Implementations may enable the observation, recording, and reporting of the temperature of containers and the contents within during transportation, during hospital usage (for blood products), and under storage conditions.

Sensor data from product containers can be received and analyzed by a monitoring program as described herein to generate profiles for contents within a container. The profiles may be generated using a container-sensor model and the sensor data. The container-sensor model can be created through experimentation, testing, and simulation based on container dimensions and other characteristics, sensor type and sensor arrangement. Thresholds can be incorporated based on the particular product in the containers and used to generate alerts when the profiles indicate sensor values (which may include values over time) outside of permitted ranges (based on the thresholds). The container-sensor model and thresholds can be retrieved in response to user input/selection or information included with the sensor data received by the system.

Specific examples of the systems and techniques are described in detail with respect to blood products. However, it should be understood that the systems and techniques are applicable to other perishable and temperature-sensitive products, some example of which are also described herein. Therefore, when an application is specifically described for blood bag handling, it should be understood that the systems and techniques can be applied for other perishable products through retrieving the appropriate container-sensor model and thresholds for the particular perishable product being monitored.

Certain implementations facilitate the monitoring of the temperature of the blood bags during the transportation process and communication of this information to community blood suppliers. In some cases, the entire transportation process can be monitored using an embodiment of the subject system. The temperature of the individual blood bags can also be monitored and logged to facilitate the decision of whether to use a blood bag when it is taken from the refrigeration system for readying for use in surgeries. While the blood product is within a monitored container, this is possible even without specific sensors on each bag. Accordingly, monitored containers may be used to facilitate the decision as to whether or not the blood is still viable after waiting unused in an operating room in poorly documented temperature conditions.

Figure 1:
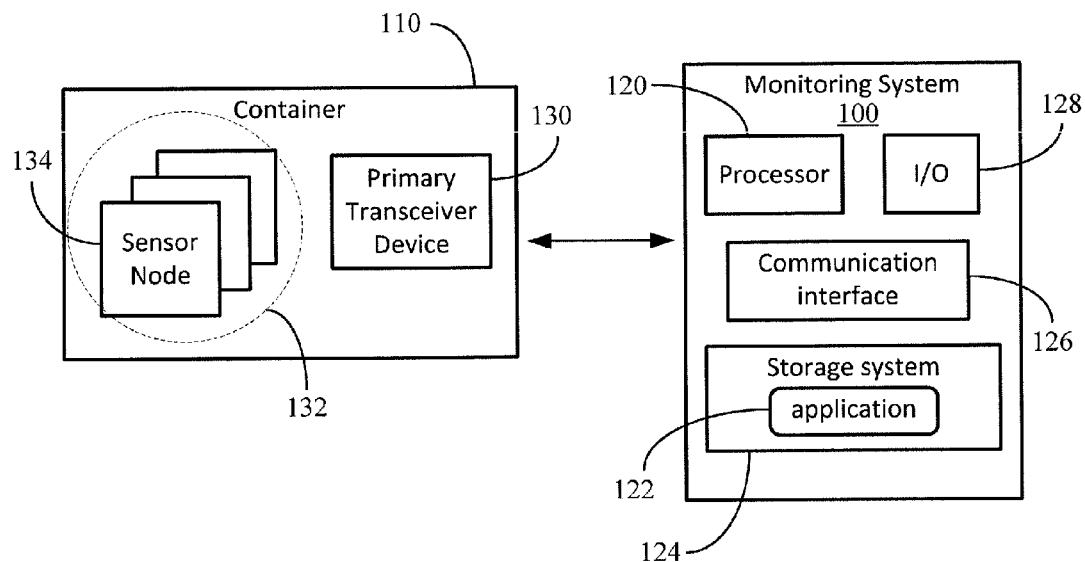
FIG. 1 illustrates an example system for wireless temperature monitoring of perishable and/or temperature-sensitive products.

FIG. 1 illustrates an example system for wireless temperature monitoring of perishable and/or temperature-sensitive products. The system illustrated in FIG. 1 is suitable for wireless temperature monitoring of blood products as well as other types of perishable or temperature-sensitive products.

Referring to FIG. 1, a monitoring system 100 for a container 110 holding perishable and/or temperature sensitive product can include a processor 120, storage system 122 (in which a monitoring application 124 is stored), communication interface 126 and input/output (I/O) devices 128 (e.g., keyboard, mouse, keypad, touchpad, display, speaker, microphone, camera, or the like). The processor 120 may be implemented within a single processing device or distributed across multiple processing devices or sub-systems that cooperate in executing program instructions. Examples of processor 120 include general purpose central processing units, application specific processors, graphic processing units, logic devices, programmable gate arrays, as well as any other types of processing devices, combinations, or variations thereof.

Storage system 122 may include any computer readable storage media that is readable by processor 120 and capable of storing software including the monitoring application 124. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage media a propagated signal.

Storage system 122 may be implemented as a single storage device but may also be implemented across multiple storage devices or sub-systems co-located or distributed relative to each other. Storage system 122 may include additional elements, such as a controller, capable of communicating with processor 120.

The monitoring program 124 and other software may be implemented in program instructions and, among other functions, may, when executed by the monitoring system 100 (generally) and/or the processor 120, direct monitoring system 100 and/or processor 120 to operate as described herein for monitoring perishable and/or temperature sensitive products. Software can include additional processes, programs or components such as operating system software or other application software. The software may also include firmware or some other form of machine-readable processing instructions executable by processor 120.

The communication interface 126 may include communication connections and devices that allow for communication between the monitoring system 100 and the container 110, as well as other containers (not shown) and other computing systems (not shown), over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication channel.

The container 110 holding perishable and/or temperature sensitive product can include a primary transceiver device 130 that communicates with the monitoring system 100 via the communication interface 126. The transmission from transceiver device 130 may be carried out over communication channels including, but not limited to, low power wireless protocols such as ANT, Bluetooth, Bluetooth Low Energy (BLE), WiFi, radio frequency (RF) (including passive or active RFID), optical, and cellular channels. In some implementations, the transceiver device 130 may include a low power/low complexity transceiver circuit.

The primary transceiver device 130 communicates with the sensor nodes 132 of the container to obtain sensor data from the one or more sensors forming each sensor node 134. Sensors that may be included individually or together at the sensor nodes 132 include a temperature sensor, humidity sensor, light sensor, wetness sensor, accelerometer, radiation detector, pressure sensor, microphone sensor, or location detector (e.g., a global positioning system (GPS)). In some cases, a specialized chemical sensor can be included for detecting chemicals (e.g., organic chemicals or decomposition-related chemistries).

In one implementation, sensor data from the sensor nodes may be provided to the primary transceiver device and/or to a monitoring system at predetermined intervals. For example, the sensor data may be transmitted on the order of every 2 seconds to several minutes to provide information about the temperatures that are observed in the container.

The primary transceiver device 130 may have a circuit board with computational and data storage ability to record a history of temperature (or other detected) conditions for the container as a whole and even calculated conditions for product at locations within the container.

The primary transceiver device 130 can record the history of sensor measurements for the temperature sensors or any other sensors that are connected. The transceiver device can report the stored sensor data when requested (in response to a request from a monitoring system 100 or according to a predetermined schedule programmed into the transceiver circuit).

Although a single primary transceiver device 130 is shown for the container 110, multiple "primary" transceiver devices 130 may be included. The reference to "primary" can refer to the transceiver device being the one that communicates information from the sensor nodes 132 to the monitoring system 100 even when a sensor node 134 may also include a transceiver.

Figure 2A:
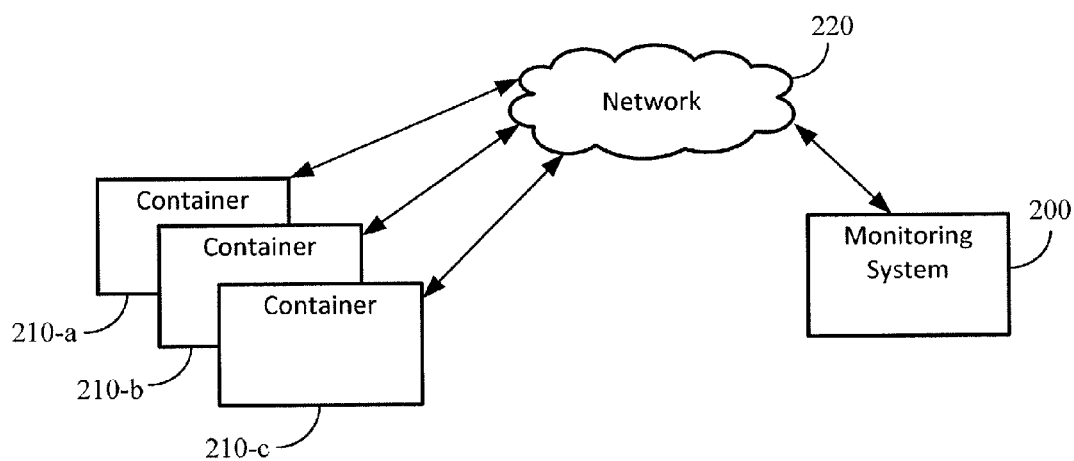
FIG. 2A and FIG. 2B illustrate example configurations of an operating environment in which the monitoring system may be implemented.
Figure 2B:
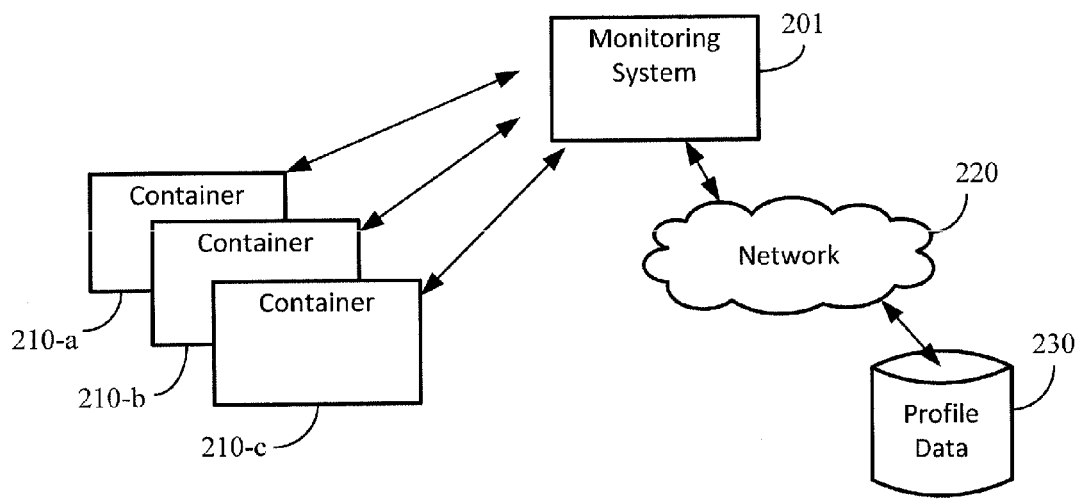

FIG. 2A and FIG. 2B illustrate example configurations of an operating environment in which the monitoring system may be implemented. As illustrated in FIG. 2A, the monitoring system 200 may be a central or distributed monitoring system that communicates with one or more containers (e.g., containers 210-a, 210-b, 210-c) over a network 220. As another implementation as illustrated in FIG. 2B, the monitoring system 201 may include a mobile computing device such as a laptop, tablet, mobile phone, personal digital assistant, or wearable computing device, or a dedicated monitoring system similar to an radio frequency identification (RFID) reader that can be used to receive signals and otherwise communicate with one or more containers (e.g., containers 210-a, 210-b, 210-c). The monitoring system 201 can also be configured to communicate over a network 220 to a database 230 and/or other systems (not shown) to provide the information generated based on the received sensor data from the one or more containers.

The network 220 described and/or shown as part of the environment illustrated in FIGS. 2A and 2B can include, but is not limited to, an internet, an intranet, or an extranet, and can be any suitable communications network including, but not limited to, a cellular (e.g., wireless phone) network, the Internet, a local area network (LAN), a wide area network (WAN), a WiFi network, an ad hoc network or a combination thereof.

Figure 3:
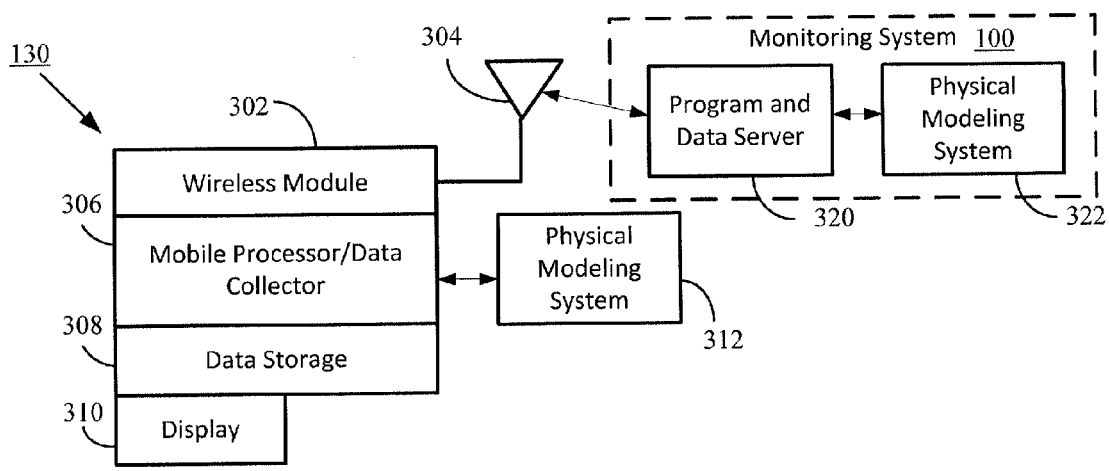
FIG. 3 illustrates an example implementation of components involved in a monitoring system environment.

FIG. 3 illustrates an example implementation of components involved in a monitoring system environment. Referring to FIG. 3, the primary transceiver device 130 of a container may include a container processing system that includes a wireless module 302 that communicates through an antenna 304. In implementations where the sensor nodes of the container include wireless sensor nodes, each wireless sensor node can include a wireless module and antenna which can transmit signals to (and in some implementations receive signals from) antenna 304.

The sensor data collected from wireless module 302 can be provided to the mobile processor and data collector 306 and put in data storage 308. In some cases, the container processing system can collect the immediate sensor readings and transmit such readings to the monitoring system 100. In some cases, the container processing system can collect a history of readings over time and transmit such history data to the monitoring system 100. The history of readings may be received in batches (of readings over time) from the sensor nodes or the history readings may be created over time from the real-time receiving of readings.

In some cases, the sensor data may be analyzed, or partly analyzed, at the container, for example, by the inclusion of a physical modeling system 312 providing monitoring application components that are executed by the mobile processor/data collector 306. The physical modeling system 312 can be used to calculate system models and parameters of interest such as discussed in detail with respect to FIG. 9. The physical modeling system 312 can use the measured data to calculate the temperature or other characteristic profile at different times in the container's handling history. These calculated results can also be saved in data storage 308.

The container processing system (and mobile processor/data collector 312) may include resources of common mobile computing devices such as smart phones, tablets, PCs, PDAs, and the like, including user input interfaces (keyboard, touchpad, voice) for data entry, programming data calculations and network communications. Optionally, a display 310 may be included on the container to enable on-container viewing of raw data, graphs of the data, and/or graphs of the data profile generated by the physical modeling system 312.

As also illustrated in FIG. 3, the wireless module 302 may communicate to a central program and data server 320 or server group in order to provide the container sensor history to a central location. In some cases where the container includes the physical modeling system, the container wireless module can communicate profile and modeling data to the central program and data server 320. The central program and data server 320 or server group can include data storage and may also include a physical data modeling system 322 to perform calculations to generate profiles of the container's conditions. In this fashion, the monitoring system 100 can include the central program and data server(s) 320 and the physical data modeling system 322.

For implementations involving a blood distribution service, the central program and data server(s) 320 can be accessed to obtain information about blood product bags in containers being monitored by the monitoring system.

The container can include an alarm component. The alarm component may include a graphical display (e.g., display 310), light emitting diode(s) (LEDs), and/or speaker(s). The alarm component can be connected to the container processing system and may be within a transceiver package or separately attached to the container, but in communication (wired or wirelessly) with the transceiver. In some cases, the alarm component causes a wireless alarm signal to be transmitted off-container to a computing device or central program and data server 320.

The alarm can be initiated in response to receiving an indication that a profile generated using the sensor data exceeded a threshold range or value.

In some cases, the alarm indications can include alerts for sensor values (e.g., temperature, temperature over time, concentration of gas) indicative that an adverse event could occur. For example, the alarm can alert individuals who transport and store the containers when temperature is anticipated to go out of specification for blood bag safe handling. An increasing temperature that is still below a dangerous level may cause an alert to occur so that an individual may adjust conditions for the container to avoid the dangerous temperature level. The alarm can alert the handlers of the blood bags to a spoilage situation in which the valuable blood bags will have to be discarded. With proper alerts that pre-anticipate a spoilage situation, spoilage may be avoided.

An alarm may also be used when there is a power or performance problem with any of the components on the container.

A wireless remote monitor of containers of blood bags and individual blood bags is described that drastically increases the information about the history of the blood bag temperature environmental conditions. Historical temperature data from a blood bag sensor system can be relayed through wireless communications to a community blood supplier data base (or other centralized database for other types of products). The community blood supplier database can be accessed to provide real time knowledge of the temperature of individual blood bags in the blood supply, providing additional safety.

For example, certain implementations of the invention measure and report the temperature of individual blood bags and are compatible with the low cost disposable cardboard blood bag carriers that are currently in use for transporting blood bags. In addition, the temperature data measured from sensors on the disposable cardboard blood bag carriers may be logged and transmitted to interface with a community blood supply center database. The monitoring/sensor devices can be configured with materials suitable for FDA requirements regarding materials used in the donation blood supply chain and in the use and disposal of materials in the hospital environment.

Figure 4A:
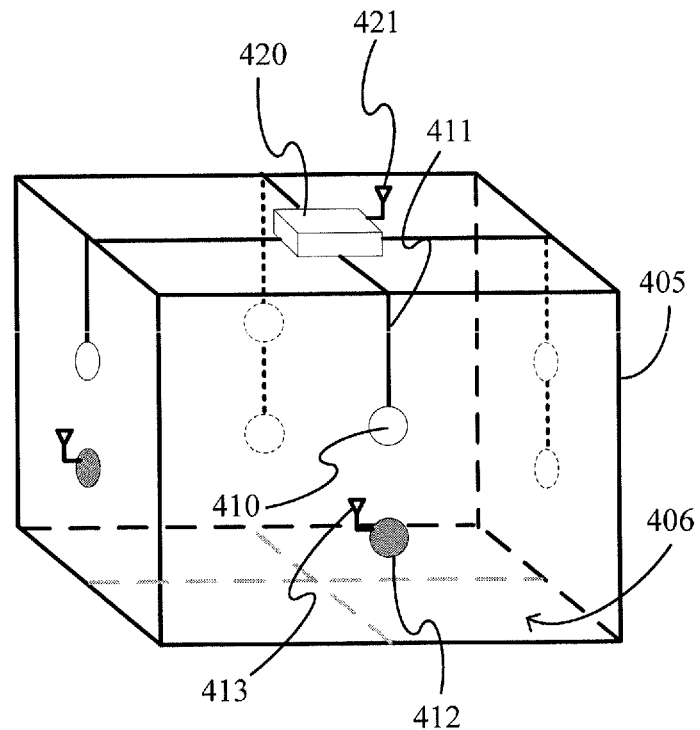
FIGS. 4A and 4B illustrate an example container configuration in which perishable and/or temperature-sensitive product may be monitored.
Figure 4B:
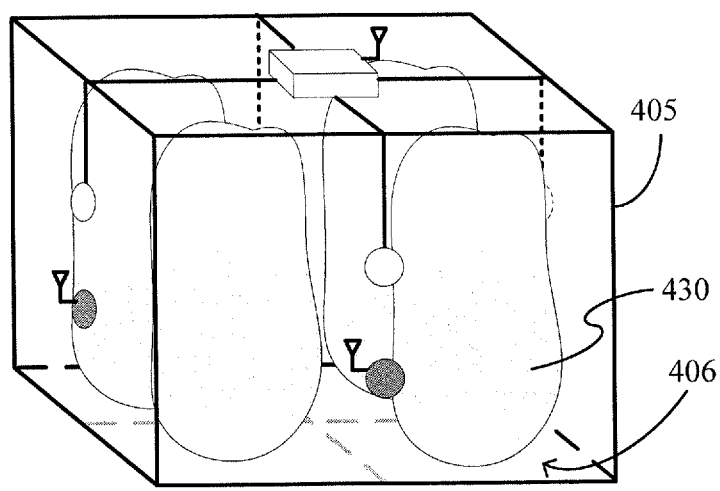

FIGS. 4A and 4B illustrate an example container configuration in which perishable and/or temperature-sensitive product may be monitored.

According to the illustrated example, a container (e.g., container 110) can be implemented as a box container 405. The box container 405 can have designated regions 406 in which product is expected to be located when packed in the container 405. In some cases, a thermal reflective lining can be included on the inside of the container 405 to keep the container cool during transport.

A plurality of sensor nodes 410 may be arranged at designated locations about the container 405. The sensor nodes 410 can be wired 411. In other cases, wireless sensor nodes 412 with antennas 413 may be used. The wireless sensor nodes 412 may include transceivers with full transceiver capability or with only transmit capability (for lower power operations). In yet other cases, a combination of wired sensor nodes 410 and wireless sensor nodes 412 may be used. A primary transceiver 420 can communicate with the sensor nodes 410, 412 to receive the sensor data and transmit the data (with or without further processing) to a computing device (not shown). When the sensor nodes include temperature sensors, the primary transceiver 420 may transmit the temperature information to a processor (or include a processor) to construct a spatial model of the temperature of the container 405.

Through physical data and simulations, a spatial model of the container may be generated so that the arrangement of the sensors about the container can be mapped to the designated regions 406. The size and shape of the designated regions 406 can depend on the particular product being contained by the container 405.

For example, the container 405 can be a box for transporting blood or other blood product such as plasma. In such implementations, blood product bags 430 can be arranged in the designated regions 406. The designated regions 406 may be defined in a manner that a user of the container can understand the most effective positioning for the contents or in a manner based on common usage and packing.

Blood bag box containers come in different sizes. The arrangement and number of the sensor nodes can vary based on the size of the box. For certain large boxes, more than one transceiver circuit element 420 (and/or antenna 421) may be used in order to handle the number of sensor nodes attached to the container. The transceiver circuit element may have limitations as to the number of sensor nodes it may be able to power (when the transceiver provides power for the circuits of the sensor nodes) as well as limitations on the distance that it may be from the sensor nodes to be able to receive their signals.

The transceiver circuit element 420 can be placed internal or external to the container 405 depending on the application.

Figure 5:
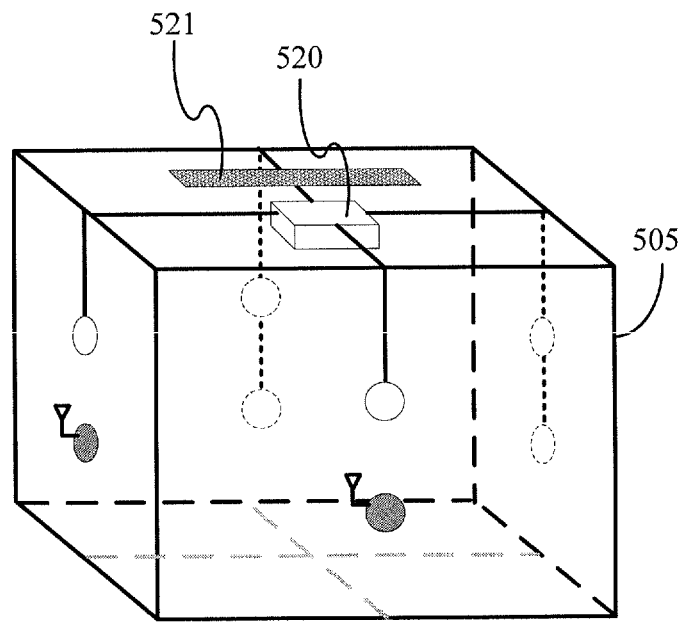
FIG. 5 illustrates an example container configuration with an external antenna.

FIG. 5 illustrates an example container configuration with an external antenna. In the example illustrated in FIG. 5, a transceiver circuit element 520 can be located inside the container 505 and a hole and connecting wire can be placed through the container to connect to an antenna 521 on the outside of the container 505. This placement of the antenna 521 is useful where a thermal shield layer is included in the container so that the thermal shield layer interference is minimized. The placement of the transceiver circuit 520 element inside the box can also better detect sensor data internal to the box (particularly where thermal shield layer materials are used).

The external antenna 521 can be made of inexpensive foil material and can be of large shape tuned to a broadcast frequency. The large shape can facilitate transmission of lower RF frequencies as compared to a miniaturized board antenna electronics that would fit on a small circuit board in the realization of a simple transceiver. The use of an inexpensive foil can facilitate the costs of the container as well as the disposability of the container.

The transceiver circuit element 520 (420, 130) may use a battery to power up the system. Since batteries may only permit function for several months to a year, other power supply options such as energy harvesting may be included in addition to or as an alternative to the battery.

Figure 6:
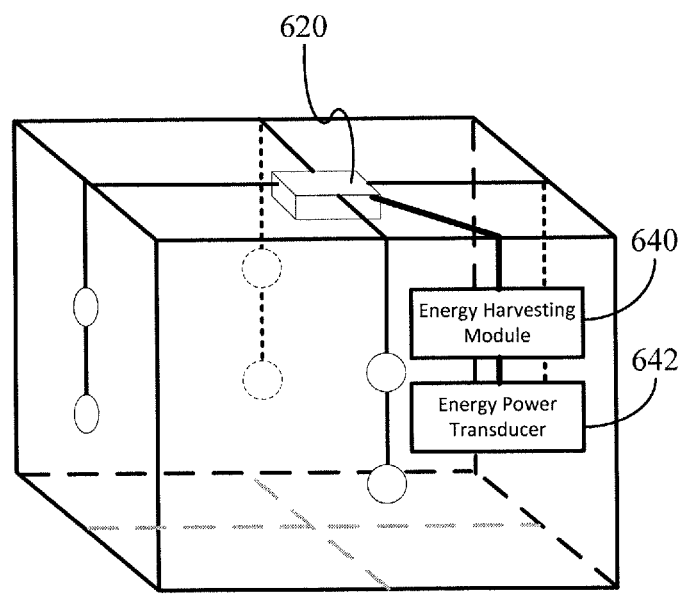
FIG. 6 illustrates an example container configuration with an energy harvesting module and transducer.

FIG. 6 illustrates an example container configuration with an energy harvesting module and transducer. The sensors and transceiver(s) used on a container may be powered by energy harvesting techniques, may involve passive devices (similar to RF tags), semi-passive devices (using battery and energy harvesting techniques), or battery powered devices.

Referring to FIG. 6, an energy harvesting module 640 can be included and connected to the transceiver circuit element 620. In the illustrated example, an energy source transducer 642 provides environment electrical energy by converting light, RF energy, magnetic energy or other convertible energy to an electrical signal which is transported to the energy harvesting module 640. Energy harvesting module 640 can condition the energy so that the energy can be stored in an energy storage device, a battery, or super capacitor that may also be included in the energy harvesting module 640 or in the transceiver circuit element 620. The energy harvesting can be used to extend the lifetime of a battery included in the transceiver circuit element 620 or to eliminate the need for a battery in the transceiver circuit element 620. In some cases where no batteries are used, certain techniques may be carried out to make sure that the containers receive the appropriate environment energy to keep the sensors and transceiver element operational.

Figure 7A:
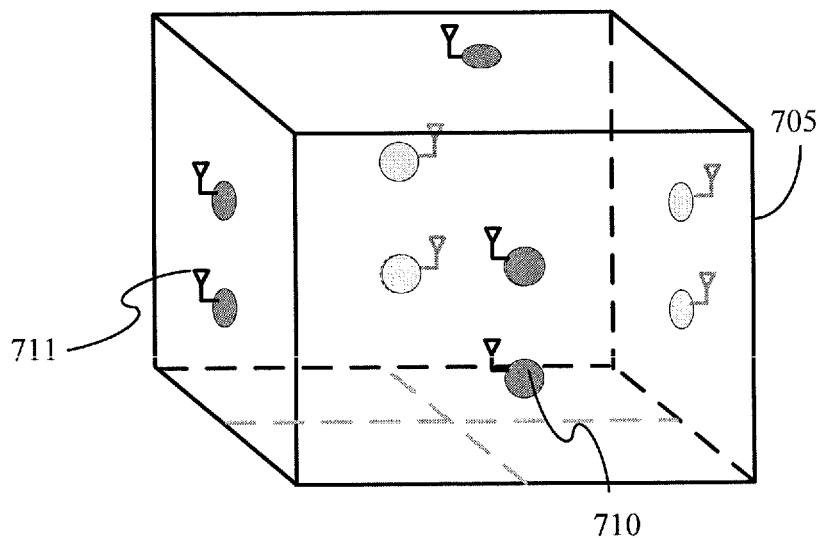
FIGS. 7A and 7B illustrate examples of a wireless sensor mesh container configuration.
Figure 7B:
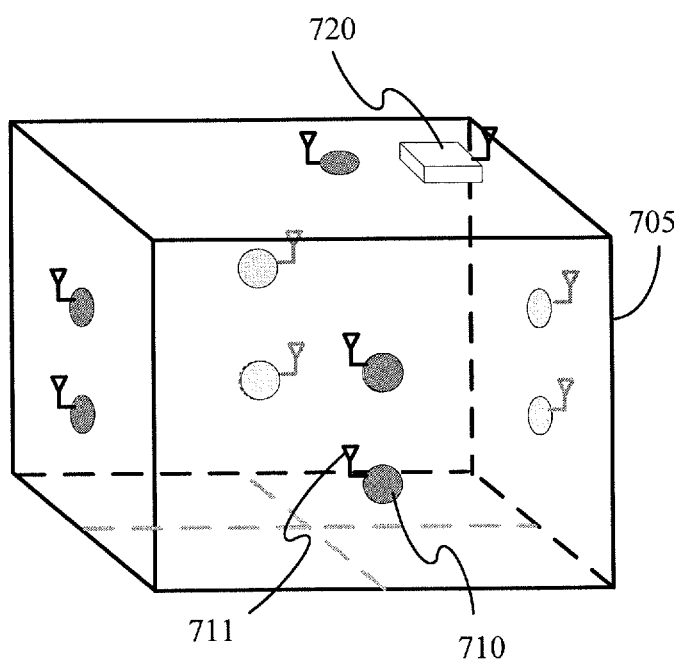

FIGS. 7A and 7B illustrate examples of a wireless sensor mesh container configuration. Referring to FIG. 7A, a container 705 may include a plurality of wireless sensor nodes 710. In some implementations at least one of the wireless sensor nodes (and in some cases a majority or all of the wireless sensor nodes) can include aspects of the container processing system described with respect to FIG. 3. For example, each wireless sensor node 710 may include a wireless module connected to an antenna 711 and may communicate with each other in a mesh network. Any of the wireless sensor nodes may then communicate with the monitoring system by either transmitting its own sensor data and location, or by transmitting the data and corresponding sensor location of multiple sensor nodes with which the sensor node communicated. In some cases, a single wireless sensor node may be designated as a primary or master node to provide the data off-container. In one such case, as illustrated in FIG. 7B, the designated master node may be a primary transceiver device 720 (such as device 130), while the remaining nodes provide the sensor data to the primary transceiver device 720.

Figure 8:
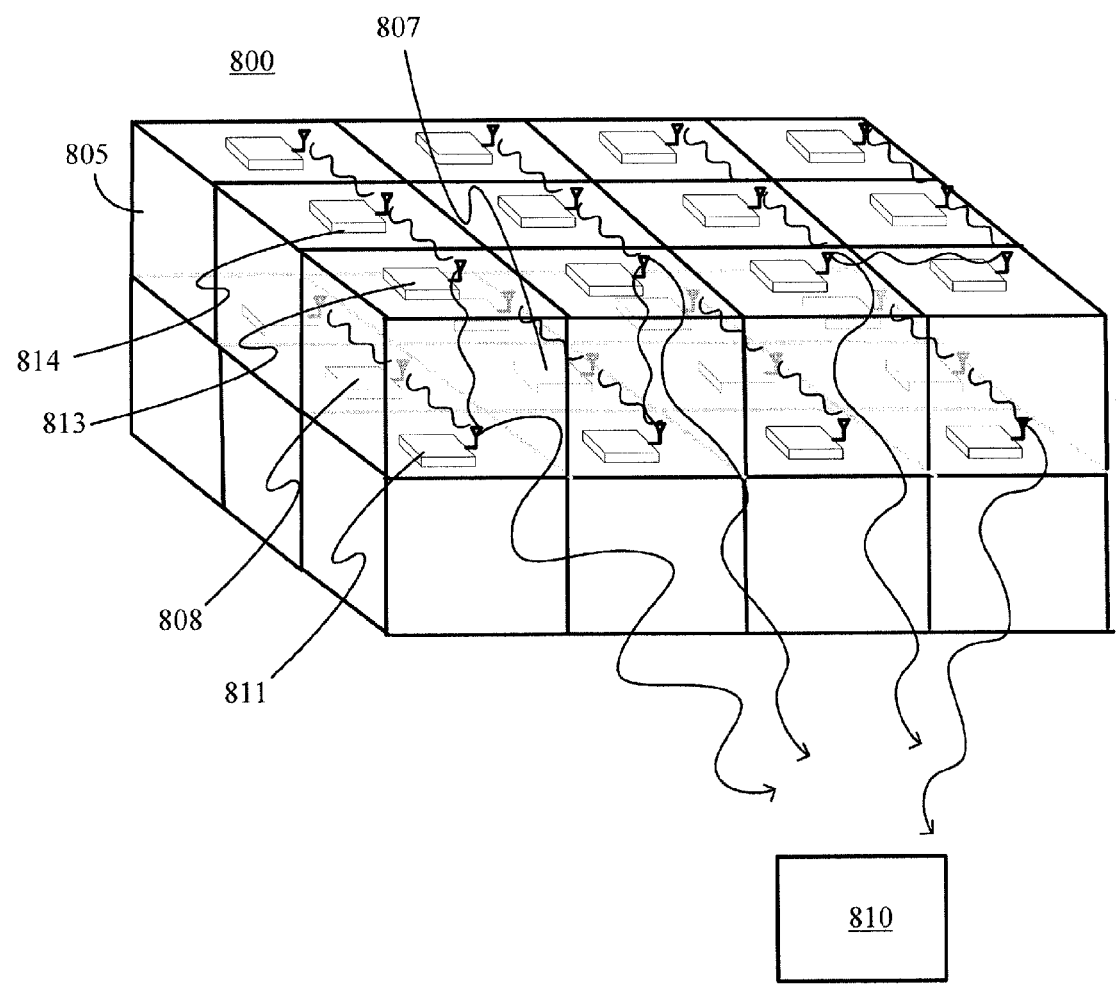
FIG. 8 illustrates an array of stacked containers that may use a relay transmission or mesh network to communicate to an external computing device.

FIG. 8 shows an exemplary stack 800 of containers 805 as they could be arranged in a vehicle such as truck, car or airplane during transport. The stack 800 consists of a number of containers 805 put on top of each other for improved storage and transport capability. This stacking is a very natural and beneficial thing to do, in some cases, because the larger mass to surface area ratio of the stack 800 of containers as compared to the individual containers 805 can keep the individual containers at their original packing temperature longer. This increases the safety of product contents during handling. Although the stacking can be beneficial to temperature for some cases, this stacking creates an issue of unreliable communication between hidden transceivers and a receiving device. This issue of unreliable communication is compounded when there is a metal object such as a metal floor, roof and side frame in the transporting vehicle. Sometimes, even when the containers are stacked loosely (such as for certain plant products that may produce heat due to cellular metabolism), communication can be blocked.

A mesh network or a custom communications network can be used to enable hidden wireless temperature sensor modules 807 and partially hidden modules 808 to communicate to a computing device 810. In this configuration, a communications method is enabled in which each wireless temperature sensor module is programmed to identify its nearest neighbor wireless temperature sensor modules (e.g., module 808 identifies at least module 807 and module 811 as well as other neighbors). This can be accomplished through a communications software package or custom software provided to the wireless temperature sensor modules.

In one implementation, the wireless sensor modules broadcast their identification for brief random periods of time. Each wireless temperature sensor module can detect the broadcasts of the nearby transmitters and measure the received signal power signal power. The modules with the highest received signal power can be an indication of being the closest. This record of the nearby processors may be saved in each individual wireless temperature sensor for setting up future communications.

When the computing device 810 queries the stack 800 of the wireless temperature sensor modules for temperature data and temperature history data, the temperature sensor modules (e.g., 808, 811, 807) that can receive the queries inside the stack respond with data transmission. Then, those temperature sensor modules that received the query can ask all their nearest neighbors if the nearest neighbors heard the data query from the computing device 810. Some of the nearest neighbors may not effectively be able to communicate with the computing device and receive the data query due to the attenuation caused by the container contents and the reflections caused by metal in the nearby environment.

If the hidden wireless temperature sensor modules (e.g., module 807) have not heard the data query then a data relay link can be set between the wireless temperature sensor modules which are shaded from direct communications to the computing device 810 and the wireless temperature sensor modules that can effectively communicate to computing device 810. The shaded wireless temperature sensor modules can then ask their nearest neighbors if those modules have received the query and a data relay link may be set up for those modules that are also not able to communicate effectively with the computing device. Through each data relay link, the modules that can communicate to the computing device 810 can communicate with their neighbors that are unable to communicate effectively to the computing device 810 and send the data from the nearest neighbors to the computing device 810.

For example, wireless sensor module 811 may be able to effectively communicate with the computing device 810; however, modules 808 and 813, which may be the nearest neighbors of module 811, were not able to communicate with the computing device 810 and therefore responded to the module 811 that they did not receive the query. Thus, a data relay link can be set up between module 808 and 811 and module 813 and 811 to communicate the data to the computing device 810. Module 813 can communicate with its nearest neighbors (e.g., module 814), and set up a data link with those that are not able to communicate with the computing device 810 to enable the sensor data to be transmitted through the data links to module 811 and ultimately to the computing device 810.

The process is continued until all the wireless temperature sensors modules that can be communicated with, can relay their data to the computing device 810. In one implementation, once the computing device 810 has received information from the wireless temperature sensor modules that there are no more data to relay from the stack 800, the computing device 810 can send out an end-of-data query signal to be relayed throughout the stack 800 and which puts the wireless temperature sensor modules in a standby mode waiting for the next data query. This can minimize communication between wireless sensor modules (and thus conserve energy).

The relaying and requests can be included in the software stored and executed by the various devices.

Figure 9:
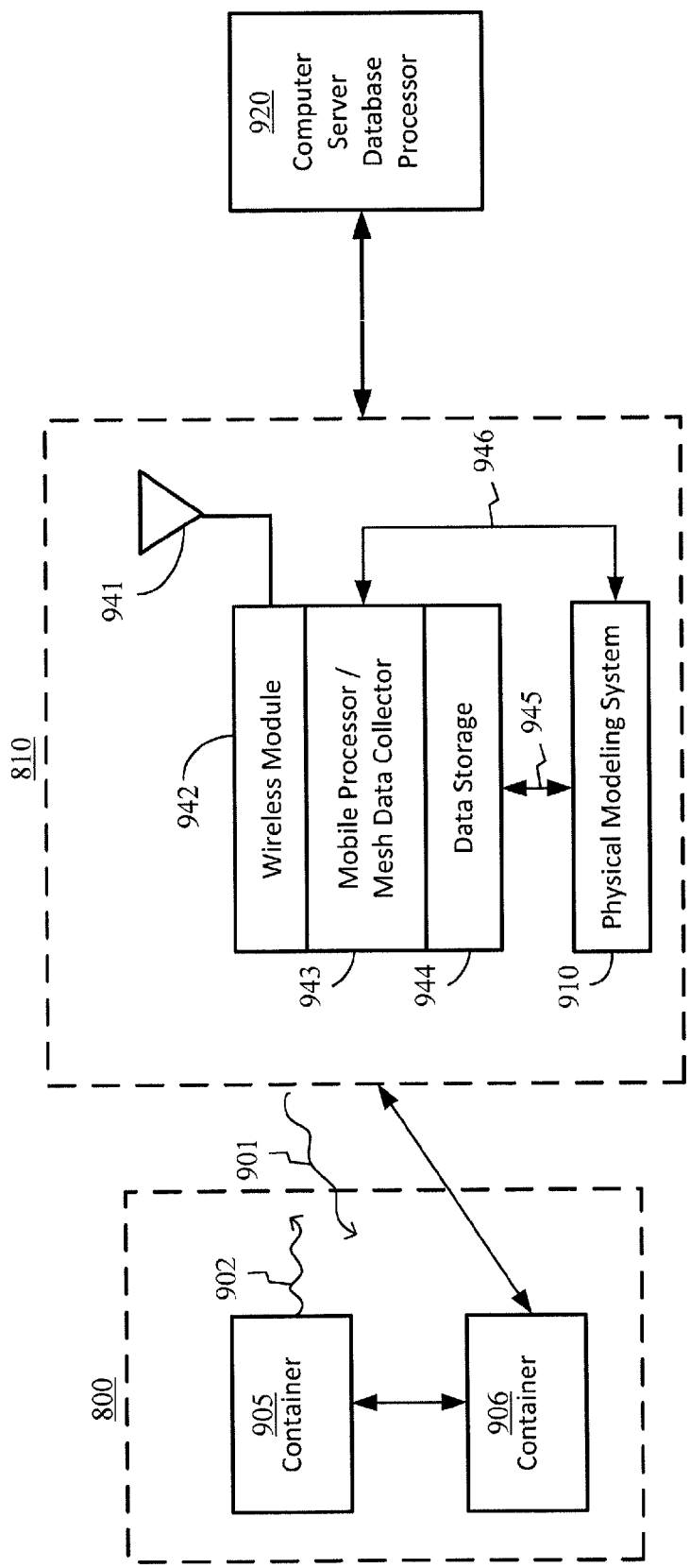
FIG. 9 illustrates an operating environment in which an array of stacked containers can be monitored.

FIG. 9 illustrates an operating environment in which the array 800 of stacked containers can be monitored. As shown in FIG. 9, the computing device 810 can communicate with containers in the stack 800 of containers and the containers may include communication modules to communicate with each other. As described with respect to FIG. 8, the computing device 810 may not be able to directly communicate with shaded (blocked) containers due to attenuation of or interference with the signal 901 transmitted from the computing device 810 or due to attenuation of or interference with the signal 902 transmitted from one of the shaded containers 905. In such cases, a shaded container 905 can communicate with one of the containers 906 that can communicate with the computing device 810.

The example computing device 810 adapted for use with stack 800 of containers by including software features in the physical modeling system 910 for handling data from a stack 800. The computing device 810 can communicate over a network to a server 920, which can perform additional processing as well as storing of the data for later or remote access. The communication between the computing device and the server can be performed, for example, via cell modem, WiFi, or other wireless technique. Alternatively or in addition, it may be possible to connect the computing device 810 to the server 920 via an Ethernet cable or other wired connection. The server 920 may represent a local or enterprise server for the organization monitoring the contents of the containers (e.g., for a blood bank) or a server in the cloud.

The server 920 can include software programs and databases (or access to such databases) that enable the information about the containers provided by the computing device 810 to be combined and analyzed with historical data from those containers (or other containers). For example, data from blood bag containers can be combined with other information about the processing and cold storage of those blood bags.

In some implementations, the server 920 executes physical modeling software and/or includes or accesses physical modeling systems to perform such modeling. The server 920 may be accessible by other devices so that data may be accessed and/or analyzed. In some cases, the server 920 may communicate with other devices to provide information about the history, conditions, alarms, sensors, and 3D modeling data about the containers and their contents.

The computing device 810 can include an antenna 941 to communicate with the containers (i.e., the wireless sensor systems and sub-sensors) of the stack 800. Other antennas or and/or systems may be included for communication with the server 920. The antenna 941 can be connected to a wireless transceiver module 942 to receive information from the stack and communicate the information to a processor and mesh data collector 943 of the computing device 810. The computing device 810 can further include data storage 944 that can be used to store data received via the antenna 941 as well as software such as physical modeling software. A physical modeling system 910 can be part of the computing device, for example stored as physical modeling software in the data storage 944 and executed by the mobile processor 943. Alternatively, the physical modeling system 910 can be a separate processing and/or storage system. In either case, access and communication channels may exist between the physical modeling system 910 and data storage 944 (via channel 945) and between the physical modeling system 910 and the mobile processor 943 (via channel 946). In some cases, the physical modeling software may be stored at least in part at the server 920. In some cases, the computing device 810 can be similar to that described with respect to the primary transceiver device 130 but configured to handle the data from a stack 800 through physical and/or software resources.

The physical modeling system 910 can generate a representational model of the containers based on a best guess estimate of location from transceiver power profiles. For example, individual locations of each wireless transceiver module and its container in the stack can be identified by taking into account the power received during transmission from each wireless transceiver module. Information from shaded containers can be embedded as part of the transmitted signal from containers having direct contact with the computing device collecting the data. The box location can be estimated using the received power level and the power reception profile provided by the shaded wireless sensor modules.

The sensor profile of the stack can be modeled by applying the received data to the representational model of the containers. For example, the data from sensors in a stack of containers is combined to develop the model for the stack of containers using a physical modeling system. The model can include both the sensor data and the wireless power reception data so that a physical organization of the containers in the stack can be developed.

Additional accuracy and customization may be obtained through user interface features that prompt a user of the system to perform data queries from two or more locations nearby the stack so that transmit and receive power profiles can be determined from different physical places near the stack. The physical model of the stack layout that is generated based on power profiles can be used to not only identify and support individual container (and even content) profiles (e.g., temperature profiles), but also to keep track of the inventory in a manner that facilitates retrieval of a particular content (because its location is mapped). For example, a blood bag container with a particular blood bag of a needed blood type can be retrieved quickly if there is an emergency demand for that blood type. Not only can its location be easily determined due to the physical modeling, but its status as being properly handled and within the appropriate temperatures can be verified.

An issue with the use of a few wireless or wired sensors in a container when monitoring content within the container is that the reported data from the sensors are points in space separated from the content within the container.

For example, when using temperature sensors, the true temperature of the content in the container is not determined since the content may be several inches from the container walls. It is very desirable to know the temperature profiles at much smaller physical distances inside the container. For example, it could be desirable to know the 3D temperature profile of the container with the temperature of the physical points separated by 1 cm in all directions. For a box that is 30 cm×45 cm×30 cm, this would require determining 40,500 temperature data points, which can be impractical and too costly to perform as a measurement.

Therefore, implementations of the subject physical modeling system extracts sensor data and interpolates the temperatures that the content experiences at a finer physical gradation than that provided by the physical temperature sensors in the container. That is, a spatial model can be generated and used to generate simulations of conditions for content within a container. The spatial model can be constructed by a processor executing software that interpolates temperature from sensor data between the sensors.

The system can further construct a temperature profile across a container and measure and report wirelessly critical events such as a lifting of the box lid and the subsequent temperature increase or an accidental puncture in the box. An alarm capability can further be provided to report issues in the temperature data. For example, when a temperature value is received that is above or below a threshold (which may be set by the FDA regulations), an alarm can be triggered. The history log can be used to determine whether the temperature of a particular box has been above or below a particular threshold for a period of time that is outside an acceptable window for safe storage/transport of a blood product. To support this functionality, the history log can include an identification of the box in question, the temperature value of one or more of the sensors (or the temperature profile of the box), and the time of the reading.

Software can be provided for constructing a temperature profile across the container. The temperature profile may be displayed in graphical or text form. The temperature profile can be used to indicate whether all or part of the blood bags in the container have been maintained at the appropriate temperature. The temperature profiles constructed by the software (executed by the processor) can then be accessed by users of the system. In some cases, the system can provide access to the temperature profiles over the Internet, via a private network, or a combination of public and private networks.

Software code and data described herein can be stored on one or more computer-readable storage media, which may include any device or medium that can store code and/or data for use by a computer system. When a computer system reads and executes the code and/or data stored on a computer-readable storage medium, the computer system performs the methods and processes embodied as data structures and code stored within the computer-readable storage medium.

Figure 10:
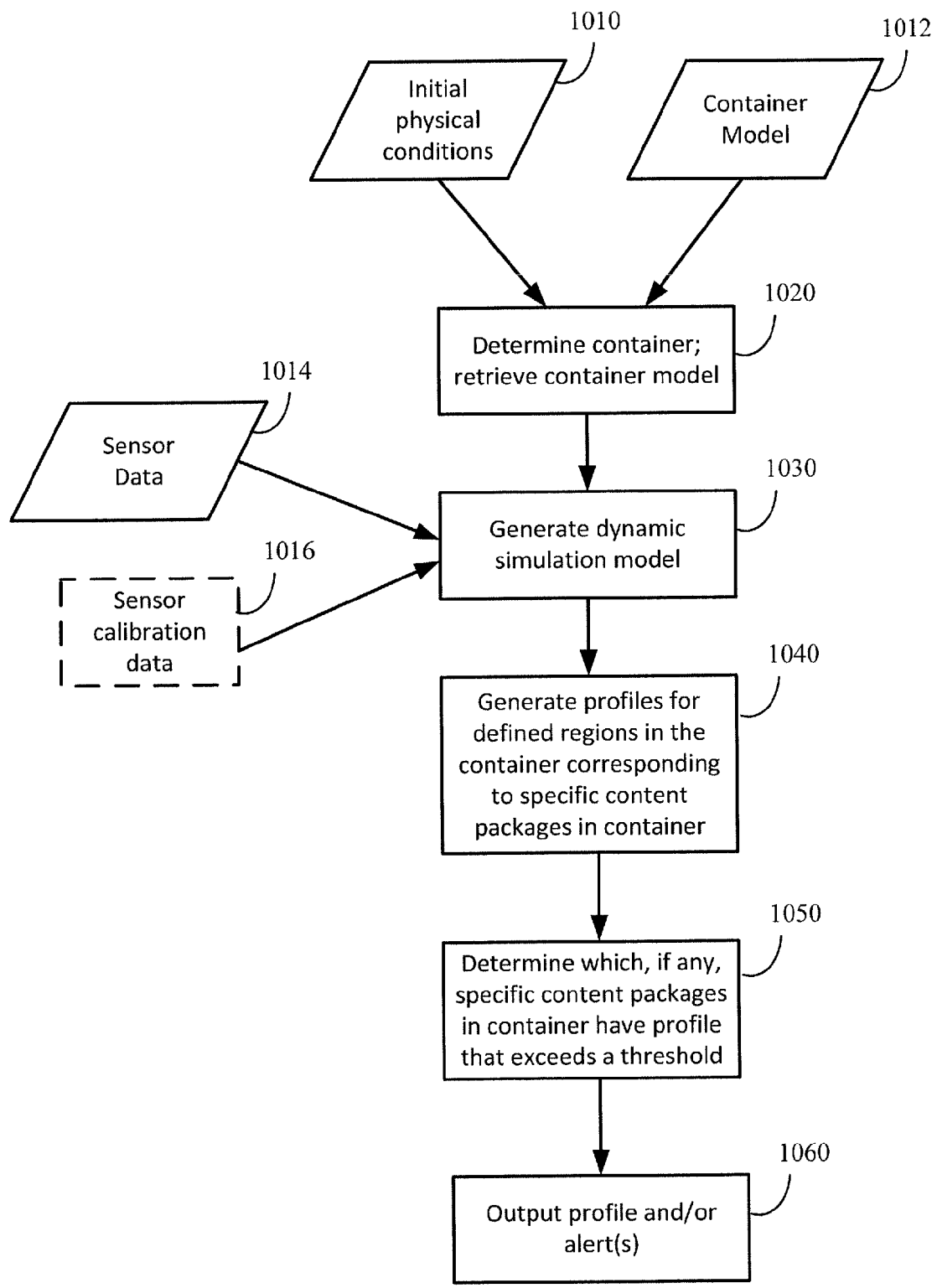
FIG. 10 illustrates a physical modeling system and process flow.

FIG. 10 illustrates a physical modeling system and process flow.

The physical modeling system can analyze and report the blood bag temperature history and determine the temperature profile inside the blood bag container over time. The blood bag container temperature can be estimated in much smaller separation of physical points from the data provided by the blood bag sensors, initial temperature data, sensor system calibration data and the physical data describing the blood bag container.

The physical modeling system (and software) may be launched or initiated automatically or in response to user input. In the exemplary embodiment using temperature sensors, a three dimensional finite element or finite difference numerical algorithm that can analyze heat transfer using a diffusion equation can be carried out by the physical modeling system. Any suitable code and algorithm that can carry out this task may be used, including those that are well known and routinely used in mechanical engineering. This discussion describes just one exemplary organization of such a physical modeling system and should not be construed as limiting.

In the process flow shown in FIG. 10, the system takes as input the information about the physical conditions 1010 of the content in the containers. In particular, information regarding the type of content and packing arrangement of the content in the container is input to the system. This may be provided by a user (for example as part of an initial set-up or programmed routine). In some cases, some of the information may be stipulated by a user or received by the system in some other manner (e.g., from a signal transmitted from the container). The information about the content can be used to select the appropriate thresholds and handling rules as well as the granularity and interpretation of signals from the sensors. For example, the information about the physical conditions of the content in the containers may be an indication that the contents are blood bags and the physical conditions include the temperature, placement, packing, and other physical variables when the blood bags were initially loaded into the blood bag container.

The physical conditions information 1010 can provide starting points for the temperature calculations.

The system also takes as input a physical model of the container 1012. The physical model of the container 1012 can include a three dimensional model of the container and thermal conduction properties (or other sensor properties) for a particular product when that product is in the container. For example, the physical model of the container 1012 for a blood product implementation may be developed using three dimensional simulations of saline filled bags and three dimensional simulations of saline filled bags placed in a container. Actual test data can be incorporated in the simulations through using wired and/or wireless temperature sensors (depending on the particular container configuration that would be in use) and various applications of heat and cold to the saline bags and containers.

Once the container information (e.g., physical conditions information 1010) and container model are retrieved (1020), sensor data 1014 received by the system can be used to generate a dynamic simulation model (1030) to model the conditions of the containers (for example, the physical modeling with a three dimensional finite element or finite difference numerical algorithm that can analyze heat transfer using a diffusion equation).

Sensor calibration data 1016 may also be included to improve the measurement accuracy during the physical modeling and profile generating. The sensor calibration data 1016 can be used to characterize and correct small errors made by the sensors (and/or the components used in transmitting the sensor data). The calibration data may be acquired by measuring the sensors' responses at known conditions (e.g., temperature for temperature sensors) and recording the values. The recorded values can be arranged into a calibration table of sensor data that can be used by the physical modeling computer system and software to extract more accurate profiles.

For a blood product example implementation, after the initial physical conditions 1010, container model 1012, and sensor calibration data 1016 are received by the system, the wireless sensor data 1014 from the containers can be used to model the temperature behavior of the blood bags in the containers. As the wireless temperature data is read into the program (either real-time or in batches, for example in periodic updates to the server), the three dimensional numerical algorithms describing heat transport can be used to estimate the physical conditions for points a distance away from the temperature sensors. The dynamic simulation (e.g., the algorithms) can be performed by a processor (e.g., mobile processor 943, physical modeling system 910, 312, 322, server 920, program and data server 320, mobile processor 306, or combination thereof) and the various data may be stored locally or remotely. Intermediate calculations and results of the physical modeling calculations can also be stored in a data storage associated with the physical modeling system (or computing system to which the physical modeling system belongs).

Through the algorithms, a dynamic simulation model of the conditions inside the blood bag container can be created (1030). This model shows how the temperature changes inside the blood bag container with time. Profiles for defined regions in the container corresponding to specific content packages in the container can be generated (1040) using the dynamic simulation model. For example, the profiles can reflect defined volumes in the container's dynamic simulation model. The profiles can be inspected to determine whether a volume has a profile indicating that the region has been allowed to be heated beyond acceptable limits (or that have shown a likelihood of entering into an unacceptable temperature range) (1050).

A profile indicating unacceptable temperature activity can indicate that the blood bags in those volumes may be compromised depending on how long the exposure is to temperatures out of limits. The evaluation of the individual blood bag viability and safety can be made by volume (e.g., defined regions) and the results reported to an alarm and/or notification module in the system. The alarm and/or notification can report that certain blood bag containers or individual blood bags are compromised.

The profiles may be provided as output and/or a warning or alert may be output that shows whether a region of the container has been maintained effectively (1060). For example, where an LED is included with the container, the system may cause the LED to change color or flash warning.

In some cases, a report of the system simulations may be generated and output to a local computational device or display or stored on a server (and/or database) for access by remote computer systems and display devices.

In addition to simple temperature modeling, the physical modeling system can use sensors in the wireless sensor module to determine other problems in the transport of the blood bags containers and create alarms. Light sensors can be used to indicate penetration or opening of the blood bag containers, accelerometers can indicate rough physical handling, humidity and wetness sensors can indicate exposure to rain and wet conditions. These sensors may report data with a time value (time stamp) that may indicate when, where and who was responsible for poor handing of the blood bag containers. Additional physical modeling may be created to incorporate the data of these sensors. For instance, Containers that have pressure sensors can include, in the container model and during the generation of the dynamic simulation model, a physical modeling to look at the exterior pressure of all the containers in the stack and determine if there could be a physical failure of the container with too much weight placed on it. Chemical and radiation sensors in the wireless sensors could be used to model individual blood bag exposure to toxins, corrosives or radiation during storage and transportation.

The use of the physical modeling system for blood bag containers (or other perishable and/or temperature sensitive product) is not restricted to after blood bags are unloaded from the containers. Because the transmission of the blood bag data is wireless it is possible and even encouraged to run the container modeling and the evaluation of blood bag viability and safety as often as practically possible. It is envisioned that using a portable computing devices the blood bag containers could be examined many times in the blood bag transportation process and the could be greatly increased health and safety for this part of the blood supply. Negligence and human errors in handling blood product can be flagged in real time. In addition, this information allows for tighter temperature control (smaller temperature spread) during the useful lifetime of the blood ultimately allowing the blood more "pristine" and effective for the patient.

Better (more informed) decisions on whether to use, how soon to use, and when to discard blood bags exposed to heated conditions can be available even where individual bags are not monitored. Information can be available in a database available to a blood supplier as well as those involved in the transportation, storage, and use of blood product. Thus, the information on the community blood supplier data base can provide highly informed decisions about the use and viability of individual blood bags in the blood supply system.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A system comprising:
   one or more storage media;
   a wireless module to receive sensor data from a product monitoring container;
   a plurality of sensor nodes to be arranged on or in the product monitoring container;
   a transceiver node to receive sensor data from the plurality of sensor nodes and transmit at least the sensor data to the wireless module; and
   a product monitoring program stored on the one or more storage media that, when executed by a processing system in operable communication with the wireless module, cause the processing system to:
      retrieve a container model indicative of at least a container size, container shape, and sensor arrangement; and
      generate a product profile of individual product components within the product monitoring container using the container model in response to receiving the sensor data from the product monitoring container.

2. The system of claim 1, wherein the product monitoring program further causes the processing system to:
   retrieve information of a product type and a corresponding one or more thresholds; and
   generate an alert in response to determining that the product profile exceeds at least one of the one or more thresholds.

3. The system of claim 1, wherein, to generate the product profile, the product monitoring program causes the processing system to:
   generate a dynamic simulation model using the product monitoring container model using an initial set of physical conditions retrieved by the system, the container model, and any sensor data received by the system, and generate profiles for predefined volumes in the container using the dynamic simulation model, the predefined volumes representing individual product components within the product monitoring container.

4. A monitoring system, comprising:
a physical modeling system comprising a processor and a physical modeling program;
a wireless module in operable communication with the processor to receive sensor data from a product monitoring container;
a plurality of sensor nodes to be arranged on or in the product monitoring container; and
a transceiver node to receive sensor data from the plurality of sensor nodes and transmit at least the sensor data to the wireless module;
wherein the physical modeling program, when executed by the processor generates a dynamic simulation model of conditions within the product monitoring container using the sensor data and a container model of the product monitoring container, the container model indicative of at least a container size, container shape, and sensor arrangement; and generates profiles for defined volumes in the dynamic simulation model of the product monitoring container, the defined volumes selected corresponding to a product type and package arrangement.

5. The monitoring system of claim 4, wherein the physical modeling program, when executed by the local processor, further directs the processor to trigger an alarm in response to generating a profile indicative of an unacceptable status or a status nearing an unacceptable level.

6. The monitoring system of claim 4, further comprising the product monitoring container.

7. The monitoring system of claim 6, wherein the transceiver node further communicates with adjacent product monitoring containers and transmits sensor data from at least one adjacent product monitoring container to the wireless module.

8. The monitoring system of claim 4, wherein the plurality of sensor nodes comprises at least one temperature sensor.

9. The monitoring system of claim 4, wherein each sensor node of the plurality of sensor nodes comprises a temperature sensor, humidity sensor, light sensor, wetness sensor, accelerometer, radiation detector, pressure sensor, microphone sensor, location detector, specialized chemical sensor, or a combination thereof.

10. The monitoring system of claim 6, wherein the product monitoring container is configured for transporting a plurality of blood product bags;
wherein each of the plurality of sensor nodes comprises at least a temperature sensor;
wherein the transceiver node comprises one or more storage media having local program instructions stored thereon that, when executed by a local processor of the transceiver node, direct the local processor to track and log temperature information from the temperature sensors.

11. The monitoring system of claim 10, wherein the physical monitoring program, when directing the processor to generate the dynamic simulation model, directs the processor to construct a spatial model of the temperature of the product monitoring container.

12. The monitoring system of claim 10, wherein the local program instructions, when executed by the local processor, further direct the local processor to trigger an alarm in response to receiving a temperature reading above or below a threshold.

13. The system of claim 1, further comprising the product monitoring container.

* * * * *